Jan. 29, 1924.

R. SPONSLER 1,482,326

CLEANING DEVICE

Filed July 28, 1923    2 Sheets-Sheet 1

Inventor
Reed Sponsler
By B.P. Hubbura
Attorney

Jan. 29, 1924.

R. SPONSLER

CLEANING DEVICE

Filed July 28, 1923    2 Sheets-Sheet 2

1,482,326

Inventor
Reed Sponsler
By R. P. Hileburn

Patented Jan. 29, 1924.

1,482,326

UNITED STATES PATENT OFFICE.

REED SPONSLER, OF HUMESTON, IOWA.

CLEANING DEVICE.

Application filed July 28, 1923. Serial No. 654,476.

*To all whom it may concern:*

Be it known that I, REED SPONSLER, a citizen of the United States, residing at Humeston, in the county of Wayne and State of Iowa, have invented certain new and useful Improvements in Cleaning Devices, of which the following is a specification.

My invention relates to a cleaning device for the cleats or lugs of traction wheels and caterpillar treads of tractors or the like.

An important object of the invention is to provide a device of the above mentioned character, which will effectively clean the cleats or lugs of a traction wheel or caterpillar tread, and is wholly automatic in operation, reliable in such operation, strong and durable.

A further object of the invention is to provide a device of the above mentioned character, which may be conveniently applied to the tractor, without materially altering the construction thereof.

A further object of the invention is to provide a device of the above mentioned character, which is particularly well adapted for use in connection with the Fordson tractor.

Other objects and advantages of the invention will be apparent during the course of the following description.

Figure 1:
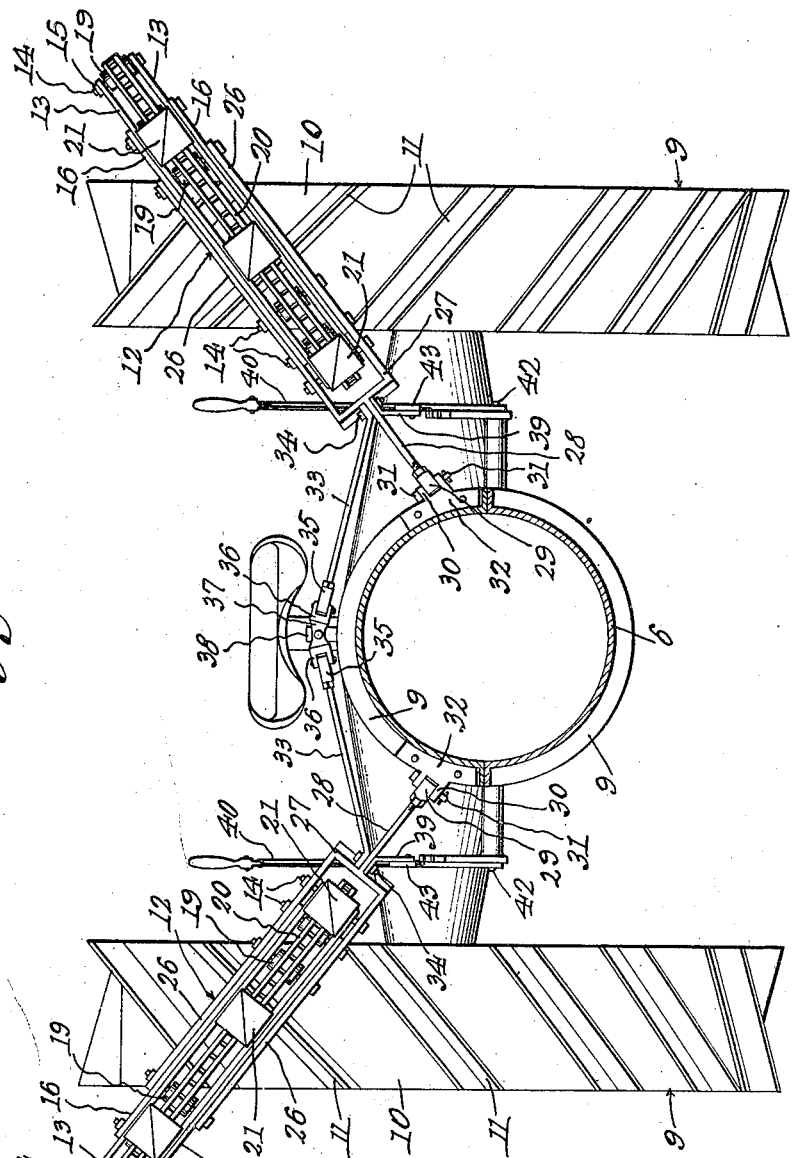
Figure 5:
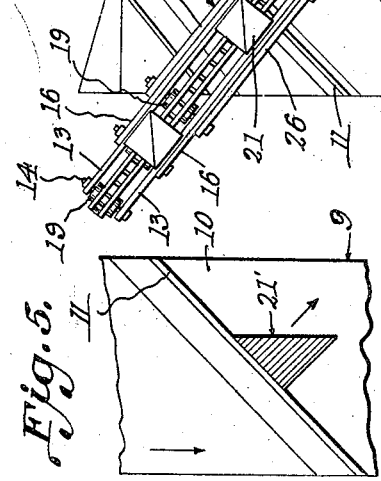
Figure 2:
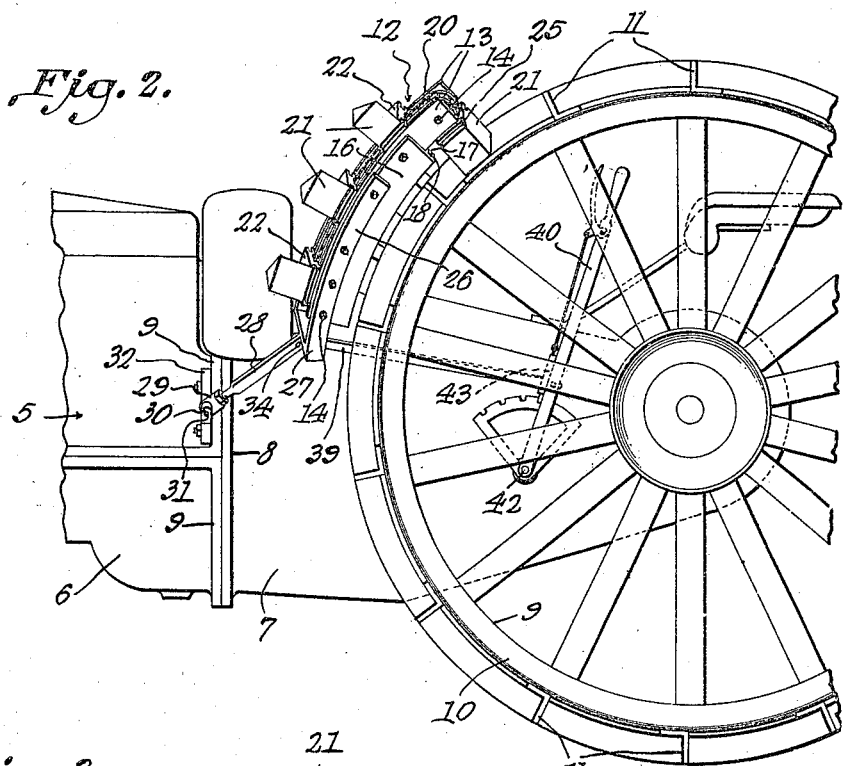
Figure 3:
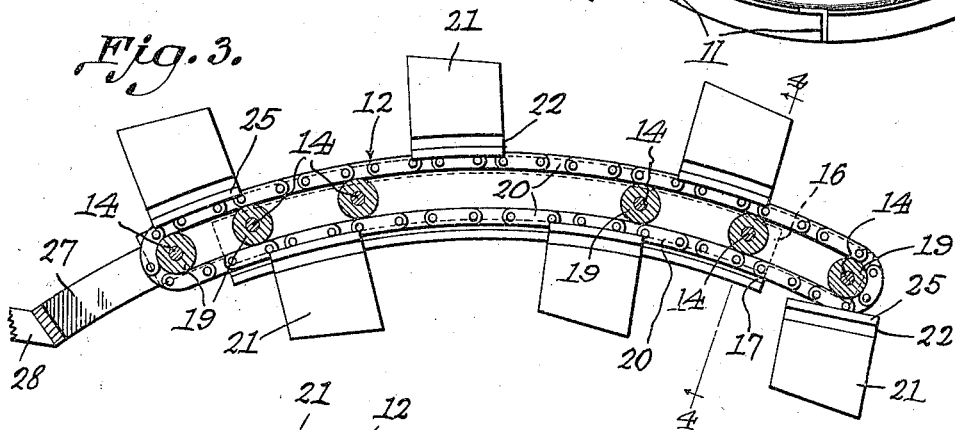
Figure 4:
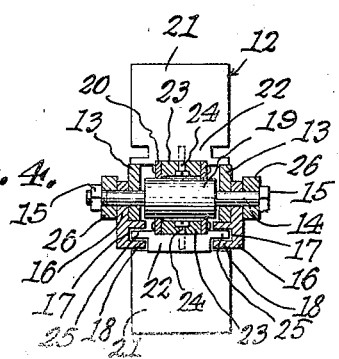

In the accompanying drawings forming a part of this specification and in which like numerals are employed to designate like parts throughout the same, Figure 1 is a front elevation of a cleaning device embodying my invention, showing the same in use, Figure 2 is a side elevation of the same, Figure 3 is a central longitudinal sectional view through one of the cleaning devices, parts in elevation, Figure 4 is a transverse section taken on line 4—4 of Figure 3, and, Figure 5 is a fragmentary plan view of one of the traction wheels, showing a cleaning element in contact therewith.

In the drawings, wherein for the purpose of illustration is shown a preferred embodiment of my invention, the numeral 5 designates the cylinder block of the tractor, having a crank case 6. The numeral 7 designates the transmission casing, having a flange 8, secured to the flanges 9. The transmission casing 7 is supported by the usual traction wheels 9, having rims 10, upon which are secured angularly arranged cleats or lugs 11, employed to prevent the traction wheels from slipping. The present invention is adapted for use in connection with the traction wheels or caterpillar treads of tractors, and in the specification and claims, the term "traction element" will be employed as including a traction wheel or caterpillar tread.

The numeral 12 designates the cleaning device, as a whole, and two of them are employed, as illustrated in Figure 1. Each cleaning device embodies a pair of spaced longitudinally curved side members 13, which are connected by bolts or shafts 14, extending through openings therein, and carrying nuts 15, as shown. Arranged upon the outer side of the side members 13, are rails 16, which are longitudinally curved, and are provided with openings, for the reception of certain of the shafts or bolts 14. These rails project downwardly beyond the lower edge of the side members 13, and are there provided with grooves 17, forming inwardly projecting flanges 18, as shown. The rails 16 terminate inwardly of the inner and outer ends of side members 13, thereby releasing the scraping elements, to be described, as they are about to turn. Rotatably mounted upon the shafts or bolts 14 are rollers 19, arranged between the side members 13, and serving to limit their inward movement.

Rotatably mounted upon the rollers 19, which are disposed in a curved group, is an endless chain or belt 20. The numeral 21 designates scraping elements, arranged upon the outer side of the endless chain and projecting outwardly therefrom. Each scraping element is provided with a base 22, which is attached to a block 23, carried by one of the links, by means of a screw or bolt 24 or the like. The base may be attached to the link by any other suitable means, and the scraping elements are preferably equidistantly spaced. Each base 22 is provided with outwardly projecting flanges 25, adapted to travel within the grooves 17, inwardly of the flanges 18.

The side members 13 are arranged within the arms or sides 26 of U-shaped supporting frames 27, and these arms have openings for receiving selected shafts or bolts 14. By this means, all of the parts are held together. The frames 27, at their inner ends, are rigidly secured to bars 28, projecting inwardly, and carrying knuckles 29. Each knuckle 29 is arranged between knuckles 30, and pivoted thereto by a bolt 31. The knuckles 30 are rigidly secured to a plate 32, which is bolted to the flange 9. Each frame 27 has connection with a diagonal brace 33, by means of a bolt 34, and the inner end of this brace carries a knuckle 35 pivoted to a knuckle 36. The knuckles 36 are carried by a head 37, suitably secured to a member 38, rigidly attached to a part of the tractor.

It is preferable that means be provided to raise and lower each cleaning device, and for this purpose a link 39 is pivoted to the bar 28, adjacent to the frame 27, by means of the bolt 34. This link extends rearwardly and is pivotally connected with a hand-lever 40, pivoted at 42. This hand lever is equipped with latch means 43, whereby it may be locked in the desired position.

Each cleaning element 21 is preferably triangular, see more particularly Figures 1, 2 and 5, while its base 22 is rectangular. This triangular cleaning element is so positioned, Figure 5, that its diagonal cleaning face 21', is arranged parallel to the plane of rotation of the wheel.

In the use of the devices, the same are arranged upon the upper portions of the traction wheels, near their forward sides. The entire device is longitudinally curved to conform to the curvature of the traction wheel and the same is arranged diagonally of the traction wheel. As the traction wheel rotates forwardly, the corresponding cleat or rib 11 is brought into contact with the cleaning element 21. The forward movement of the angularly arranged cleat 11 tends to move the cleaning element 21 forwardly, and by virtue of the angular arrangement of the cleaning devices, the cleaning element partakes of a diagonal movement, which is the resultant of the rotatable movement of the traction wheel, and a lateral movement at a right angle thereto. This causes the cleaning element to travel longitudinally of the angularly arranged cleat, and to thoroughly scrape the mud, dirt or the like collected thereon, from the same, and also from the space between the cleats, upon the rim of the wheel.

It is also obvious that the device will operate in connection with a caterpillar tread having cleats or projections.

It is to be understood that the form of my invention herewith shown and described is to be taken as a preferred embodiment of my invention, and that various changes in the shape, size, and arrangement of parts may be resorted to without departing from the spirit of my invention, or the scope of the subjoined claims.

Having thus described my invention, I claim:

1. The combination with a traveling traction element having transversely inclined cleats, of an endless belt supported across the cleats and being free from positive driving means, non-rotating scraping blocks having inclined faces to engage with the cleats and to be shifted thereby longitudinally of the cleats which they clean when traveling longitudinally thereof, said scraping blocks being secured to the endless belt so that they cannot turn upon their individual axes with relation to the endless belt.

2. The combination with a traveling traction element having transversely inclined cleats, of a support held across the cleats and arranged at an acute angle with respect to the plane of rotation of the traveling element, an endless belt carried by the support, and non-rotating scraping blocks mounted upon the endless belt, said blocks having inclined faces to engage with the cleats to be shifted thereby and to scrape the cleats, said blocks also having scraping faces which are substantially parallel with the plane of rotation of the traveling element, said scraping blocks being secured to the endless belt in a manner to prevent them from turning upon their individual axes with relation to the belt.

3. The combination with a traveling traction element having transverse cleats, of a frame extending across the cleats, an endless belt mounted upon the frame, a plurality of non-rotating cleaning blocks having bases secured to the belt, and a rail secured to the frame and extending longitudinally thereof, said rail and said bases having interlocking means serving to positively prevent the individual turning movement of the blocks upon their axes with respect to the endless belt.

4. The combination with a traveling traction element having transverse cleats, of a frame extending across the cleats, an endless belt mounted upon the frame, a plurality of substantially triangular cleaning blocks having substantially rectangular bases which are secured to the endless belt, said bases having flanges, and tracks mounted upon the frame and extending longitudinally thereof and having grooves for receiving said flanges, the flanges and grooves positively preventing the blocks from turning upon their axes with respect to the endless belt.

In testimony whereof I affix my signature.

REED SPONSLER.